United States Patent
Broadwater et al.

(10) Patent No.: US 8,680,433 B2
(45) Date of Patent: Mar. 25, 2014

(54) METHOD AND APPARATUS FOR HAND HELD AND ROBOTIC WELDER

(75) Inventors: Randy R. Broadwater, Fremont, WI (US); Joseph K. Fink, Black Creek, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1940 days.

(21) Appl. No.: 11/419,485

(22) Filed: May 19, 2006

(65) Prior Publication Data

US 2007/0267395 A1 Nov. 22, 2007

(51) Int. Cl.
*B23K 9/10* (2006.01)

(52) U.S. Cl.
USPC .................. 219/137.31; 219/130.5; 219/137.7

(58) Field of Classification Search
USPC .......... 219/124.1, 125.1, 130.1, 130.5, 137.7, 219/137.31
See application file for complete search history.

(56) References Cited

U.S. PATENT DOCUMENTS

| | | | |
|---|---|---|---|
| 6,627,849 B2* | 9/2003 | Ihde et al. .................. | 219/130.5 |
| 6,720,529 B2* | 4/2004 | Davidson et al. ......... | 219/137.71 |
| 6,855,914 B1* | 2/2005 | Kaufman et al. ......... | 219/137.71 |
| 2006/0138116 A1* | 6/2006 | Lipnevicius ............ | 219/137.71 |

OTHER PUBLICATIONS

Miller® Axcess 450, OM-211 434C, Jan. 2004 Axcess Systems, Software Driven Multi-Mig™ Process Platform Jun. 2004.
Controlled Metal Transfer (CMT) 2004.

* cited by examiner

*Primary Examiner* — Henry Yuen
*Assistant Examiner* — Ayub Maye
(74) *Attorney, Agent, or Firm* — George R. Corrigan

(57) ABSTRACT

A method and apparatus for automatic or hand held welding is disclosed and includes a power circuit with a controller. The controller has a robot detector. A hand-held module and a robot interface are responsive to the robot detector. A user interface provides welding parameter setpoints to the hand held module when the robot detector detects a gun, or the absence of a robot. When a gun is present, the trigger on the gun is used to cause power to be provided, and/or welding parameters are set by the user interface on the system. When a robot is present the robot controls the process. The detection is done at start-up, or at other times.

14 Claims, 2 Drawing Sheets

METHOD AND APPARATUS FOR HAND HELD AND ROBOTIC WELDER

FIELD OF THE INVENTION

The present invention relates generally to the art of welding and welding power supplies. More specifically, it relates to welding with a system suitable for automated welding.

BACKGROUND OF THE INVENTION

There are many known types of welding systems used for many different welding processes. Welding system, or system for welding, as used herein, includes one or more of a power source, controller, wire feeder, and a source of gas, it may also include peripherals such as robots, etc. Welding power supply, as used herein, includes any device capable of supplying welding power including power circuitry, control circuitry and other ancillary circuitry associated therewith.

Some welding power supplies are dedicated for use in semi-automatic (hand held welding), and others for automated (with a robot) welding. The connections and controls are specifically designed for either hand held or robotic welding. The Miller Axcess™ welding system is an example of a sophisticated system designed for robotic welding.

Some customers use more than one type of robot. One prior art robotic welding system, described in U.S. Pat. No. 6,627,849 which is hereby incorporated by reference, uses pin connections on a cord to determine the type of robot to which it is connected. After determining the type of robot, the system then is able to properly interpret the commands from that particular robot.

Also, some customers use both robotic and hand held welding systems. Customers who use robotic and hand held welding systems sequentially could benefit by having a single power supply that is used with the robot and the gun. Customers that simultaneously use multiple welding systems, including robotic and hand held, could benefit by having a single back-up power supply for both robot and hand haled systems.

Accordingly, a welding system that can be used as part of an automated system or as part of a non-automated or semi-automatic system is desirable. Preferably, such as system will not require the user to reconfigure the system and will automatically determine if it is connected to a robot or a gun.

SUMMARY OF THE PRESENT INVENTION

According to a first aspect of the invention a welding system may be used as a robotic and a hand held welder. It includes a power circuit with a controller. The controller has a robot detector. A hand-held module and a robot interface are responsive to the robot detector. A user interface provides welding parameter setpoints to the hand held module when the robot detector detects a gun. In this mode the trigger on the gun is used to cause power to be provided. The robot interface is connected to receive a signal indicative of at least one robot welding parameter from the robot detector if a gun is not detected.

According to a second aspect of the invention a method of robotic or hand held welding includes providing welding power and interfacing with a robot or a hand held welder. The systems detects whether a robot or a welding gun is connected, and obtains at least one welding parameter input from the robot if the robot is detected, and at least one welding parameter input from a user interface if the welding gun is detected. The welding power is controlled in response to the at least one welding parameter.

According to a third aspect of the invention an adaptor cord connects an automated welding system and a hand held welding gun, and has a first end that is part of a mated connection. The mated connection has a plurality of connectors, and signals provided on the plurality of connectors indicate the presence of a welding gun and/or the absence of a robot. The cord has a second end connected to or capable of connecting to a welding gun.

The robot detector includes a first part of a mated connection, and a first adaptor cord can connect to the first part and to a hand held welding gun, and a second adaptor cord can connect to the first part and a welding robot or welding robot controller in various embodiments. The ends of the cords can be hard wired.

The robot detector includes software implemented by a digital circuit in other embodiments. The software can use the presence and absence of connections made on a plurality of connectors in the mated connection and selectively activates one of the hand held module and the robot interface.

The system includes a wire feeder in another embodiment.

The robot interface and/or user interface provide setpoints for voltage, wirefeed speed and trim in various embodiments.

The detection is done at start-up, or at other times, in various embodiments.

Other principal features and advantages of the invention will become apparent to those skilled in the art upon review of the following drawings, the detailed description and the appended claims.

Figure 1:
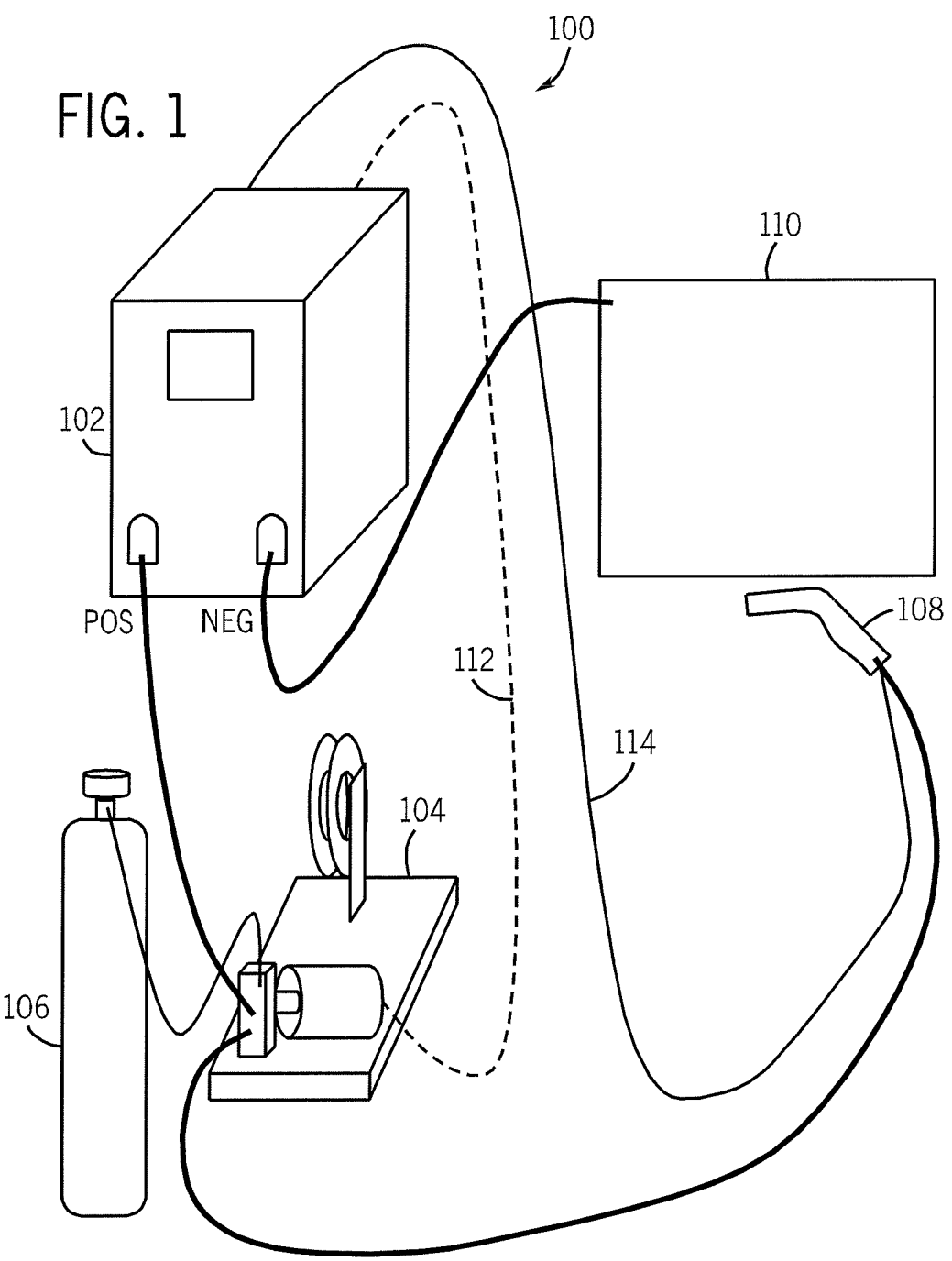
FIG. 1 is a diagram of welding system in accordance with the preferred embodiment.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular system using a particular way to detect the hand held gun or robot, it should be understood at the outset that the invention can also be implemented with other systems using other components and determining the connection in other ways.

Generally, the invention includes a welding system that is useful for automated and hand held welding. The invention provides a simple method for the operator of a welding power supply to convert an automation (robot controlled) welder to a hand held welder and back again. This allows a user to maintain one back-up welding power supply for handheld and automated systems.

The system can be connected to a robot or a gun, and the system detects which is connected. The system operates in a selected mode as a result of the detection. The preferred embodiment preferably using a detection system based on the presence or absence of connections on a plurality of connections on an adaptor cord, such as that described in U.S. Pat. No. 6,627,849. Thus, the invention uses a specially designed "smart" cord that is connectable to the welding power supply. Adaptor cord, as used herein, includes a cord having a mated connection on one end for a first type of connector, and a mated connection on the other end for a second type of connector.

The system includes a robot detector that detects the presence or absence of connectors on a cord, and a hand held module that is responsive to the detection and reconfigures the system. The module includes the software and hardware needed to make the detection, and can be considered to include the cord. Controller, as used herein, includes digital and analog, circuitry, discrete or integrated circuitry, microprocessors, DSPs, etc., and software, hardware and firmware, located on one or more boards, used to control a device such as a power supply. Hand-held module, as used herein, includes a module used to detect a gun, receive control signals from a user interface and/or a gun, and/or configure a controller to receive control signals from a hand held welding gun. Hand held welder, as used herein, includes a welder having a user held welding gun. Module, as used herein, includes digital and analog circuitry, and may be hardware or software, that cooperates to perform one or more functions. Robot detector, as used herein, includes a module used to detect, receive control signals from, and/or configure a controller to receive control signals from a welding robot and/or robot interface. Robot interface, or interfacing with a robot, as used herein, includes an interface that understands and receives information from and sends information to a robot (including the robot controller).

When the system detects the cord has the connections indicating a gun, it uses the hand held module to reconfigure itself to be a hand held welding system. In this mode the user interface controls the welding parameters (analogs) such as voltage, wire feed speed (wfs), trim, e.g., (normally sent from the robot), and the adaptor cord provides an input for the weld gun's trigger (start welding) signal. User interface, as used herein, includes a welding power supply or system front panel, robot controller interface, pendant, pda, etc. If the system does not detect a cord indicating a gun, it configures itself (using a robot interface) to be an automated system. Thus, the system selectively activates either a hand held module or robot interface. Selectively activate, as used herein, means to activate one of a plurality of inputs, but not all of the plurality. Welding parameter, as used herein, includes an output parameter such as current, voltage, power, frequency, arc length, or other parameter, and functions thereof, such as derivatives, integrals, multiplications etc.

Referring now to FIG. 1, a welding system 100 includes a power supply 102, a wire feeder 104, a source of gas 106, and a hand held gun 108 that cooperate to provide welding power to a workpiece 110. Gun 108 may also be a robot, because system 100 is able to operate in an automatic and hand held mode. System 100 may operate as a prior art Miller Axcess™ welding system, except with respect to detect and being used with a gun.

Cords 112 and 114 connect wire feeder 104 and gun 108 to power supply 102. Either cord (or another cord) can be an adaptor or smart cord and include the connectors used to indicate the gun is being used (or a robot is being used), although the preferred embodiment uses cord 114. A controller is part of either wire feeder 104 or power supply 102, or is in a separate housing, and includes a user interface. The controller provides signals to a control input of the power circuit of power supply 102, causing it to provide the desired output power. Control input, as used herein, includes an input received that controls a power supply or other component, such as a setpoint, gate signals, phase control signals, etc.

Figure 2:
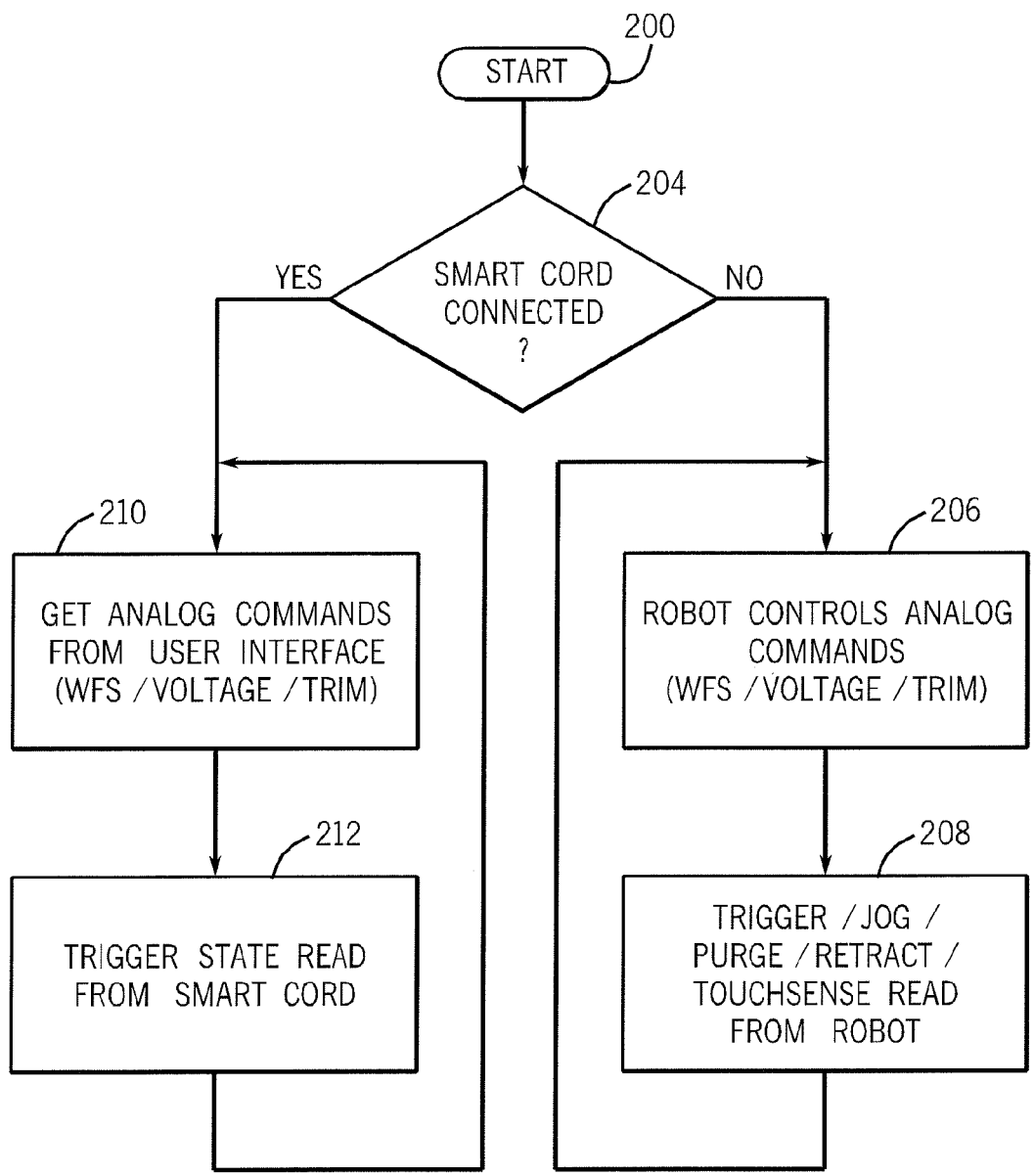
FIG. 2 is a flow chart of a routine in accordance with the preferred embodiment.

Referring now to FIG. 2, a flow chart shows a routine that implements the hand held module. The routine starts at 202, and at 204 it is determined if the "smart" cord indicating a hand held gun is connected. Preferably this is done using the presence and absence of connections (or logic signal such as 1/0, high/low, etc.) on cord 112 or 114 which has a plurality of connectors.

If the cord indicates gun is not attached, system 100 is configured so that the robot controls the welding parameters at 206, and the trigger, jog, purge, retract is also controlled by the robot at 208.

If the cord indicates a gun is attached, system 100 is configured so that user interface on system 100 (either on wire feeder 104 or power supply 102, preferably) controls the welding parameters at 210, and the trigger state is controlled by cord 114 and gun 108 at 210.

The preferred embodiment provides that the check is made only at start up, but alternatives provide for checking at every arc start, periodically or as desired.

Numerous modifications may be made to the present invention which still fall within the intended scope hereof. Thus, it should be apparent that there has been provided in accordance with the present invention a method and apparatus for welding with a system that may be sued for automatic or hand held welding that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding system for use as a robotic and hand held welder, comprising:
   a power circuit having at least one control input;
   a controller having at least one power control output connected to the at least one control input, wherein the controller further includes a robot detector, a hand-held module responsive to the robot detector, and a robot interface responsive to the robot detector; and
   a user interface;
   wherein the hand held module includes an input connected to receive at least one welding parameter setpoint from the user interface, and wherein the hand held module further is connected to receive a signal indicative of a welding hand held trigger from a welding gun, and is further connected to the at least one power control output; and
   wherein the robot interface is connected to receive a signal indicative of at least one robot welding parameter from the robot detector and further is connected to the at least one power control output.

2. The system of claim 1, wherein the robot detector includes a first part of a mated connection, and the system further comprises:
   a first adaptor cord having a first end connectable to the first part of the mated connection, and a second end connectable to a hand held welding gun; and a second adaptor cord, having a third end connectable to the first part of the mated connection, and a fourth end connectable to at least one of a welding robot or welding robot controller.

3. The system of claim 1 wherein the robot detector is comprised of software implemented by a digital circuit.

4. The system of claim 1 further comprising a wire feeder connected to an output of the power circuit.

5. The system of claim 1 wherein the at least one welding parameter includes voltage, wirefeed speed and trim.

6. The system of claim 1, wherein the at least one robot welding parameter includes voltage, wirefeed speed and trim.

7. The system of claim 1 wherein the robot detector is active only at start-up.

8. The system of claim 3, wherein the robot detector includes a first part of mated connection having a plurality of connectors, wherein the software uses the presence and absence of connections made to the plurality of connectors to selectively activate one of the hand held module and the robot interface.

9. The system of claim 2, wherein at least one of the second and fourth ends is hard wired.

10. An adaptor cord for connecting an automated welding system and a hand held welding gun comprising:
    a first end having a first part of a mated connection, wherein the first part of the mated connection has a plurality of connectors, and wherein the signals provided on the plurality of connectors indicate the presence of a welding gun and the absence of a robot; and
    a second end capable of being connected to a welding gun.

11. The cord of claim 10 wherein the cord provides a welding trigger signal to the welding system from the welding gun.

12. A system for welding as a robot or a hand held gun comprising:
    means for providing welding power;
    means for interfacing with a robot or a hand held welder;
    means for detecting whether a robot or a welding gun is connected to the means for interfacing, wherein the means for detecting is connected to the means for interfacing;
    means for obtaining at least one welding parameter input from the robot through the means for interfacing, if the robot is detected, wherein the means for obtaining is connected to the means for detecting and the means for interfacing;
    second means for obtaining the at least one welding parameter input from a user interface if the welding gun is detected, wherein the second means for obtaining is connected to the means for detecting and the user interface; and
    means for controlling the welding power in response to the at least one welding parameter, connected to the means for obtaining, the second means for obtaining, and the means for providing power.

13. The system of claim 12, further comprising a first cord connectable to the means for interfacing and connected to the welding gun.

14. The system of claim 13, further comprising a second cord connectable to the means for interfacing and connectable to a robot or robot controller.

* * * * *